United States Patent [19]

Yamagami et al.

[11] Patent Number: 5,592,465
[45] Date of Patent: Jan. 7, 1997

[54] DISC RECORDING METHOD

[75] Inventors: Tamotsu Yamagami, Kanagawa; Tetsu Watanabe, Tokyo; Yoichiro Sako, Chiba, all of Japan

[73] Assignee: Sony Corporation, Japan

[21] Appl. No.: 348,751

[22] Filed: Dec. 2, 1994

Related U.S. Application Data

[63] Continuation of Ser. No. 969,144, filed as PCT/JP92/00771, Jun. 17, 1992, published as WO92/22898, Dec. 23, 1992, abandoned.

[30] Foreign Application Priority Data

Jun. 17, 1991 [JP] Japan .................................. 3-144836

[51] Int. Cl.6 .................................................. G11B 7/24
[52] U.S. Cl. ........................... 369/275.3; 369/48
[58] Field of Search .............................. 369/48, 50, 54, 369/58, 44.32, 44.26, 44.11, 44.34, 275.3; 360/48

[56] References Cited

U.S. PATENT DOCUMENTS

| | | | |
|---|---|---|---|
| 4,819,218 | 4/1989 | Barnard ................................. | 360/48 |
| 4,896,311 | 1/1990 | Ishihara ................................ | 369/50 |
| 5,036,408 | 7/1991 | Leis et al. ............................. | 360/48 |
| 5,107,473 | 4/1992 | Fuji et al. ............................. | 369/48 |
| 5,124,967 | 6/1992 | Isaka et al. ........................... | 369/48 |
| 5,170,385 | 12/1992 | Senshu et al. ......................... | 369/48 |
| 5,172,357 | 12/1992 | Taguchi ................................. | 369/48 |
| 5,193,034 | 5/1993 | Tsuyoshi et al. ...................... | 360/51 |
| 5,206,847 | 4/1993 | Kanda .................................. | 369/44.26 |
| 5,233,590 | 8/1993 | Ogawa ................................... | 369/48 |
| 5,237,554 | 8/1993 | Senshu et al. ......................... | 369/48 |
| 5,255,261 | 10/1993 | Iida et al. ............................ | 369/275.3 |

FOREIGN PATENT DOCUMENTS

| | | |
|---|---|---|
| 0390601 | 10/1990 | European Pat. Off. . |
| 2635401 | 2/1990 | France . |
| 3809223 | 10/1988 | Germany . |
| 59-116911 | 7/1984 | Japan . |
| 63-220482 | 9/1988 | Japan . |
| 63-220481 | 9/1988 | Japan . |
| 2-189769 | 7/1990 | Japan . |
| 2-189746 | 7/1990 | Japan . |
| 2-189742 | 7/1990 | Japan . |
| 2-179980 | 7/1990 | Japan . |
| 2-260286 | 10/1990 | Japan . |
| 2-260285 | 10/1990 | Japan . |
| 3-130968 | 6/1991 | Japan . |
| 3-130985 | 6/1991 | Japan . |

OTHER PUBLICATIONS

Patent Abstracts of Japan vol. 8, No. 1 (p–246) (1438) Jan. 6, 1984 & JP–A–58 166 538 (Hitachi Seisakusho K.K.) Oct. 1, 1983 * abstract *.

*Primary Examiner*—Nabil Z. Hindi
*Attorney, Agent, or Firm*—Limbach & Limbach L.L.P.

[57] ABSTRACT

In a disc recording method in which a disc on which servo control data is recorded in advance in alignment with a radial direction is divided into a plurality of zones in the radial direction and digital data having different clock rates are recorded on every zone, reference data for detecting the quality of a recording signal is recorded on a whole recording data area of one segment segmented by at least said servo control data. Therefore, the reproduction of data recorded in the zone-recording fashion can be controlled with ease in any zone.

6 Claims, 17 Drawing Sheets

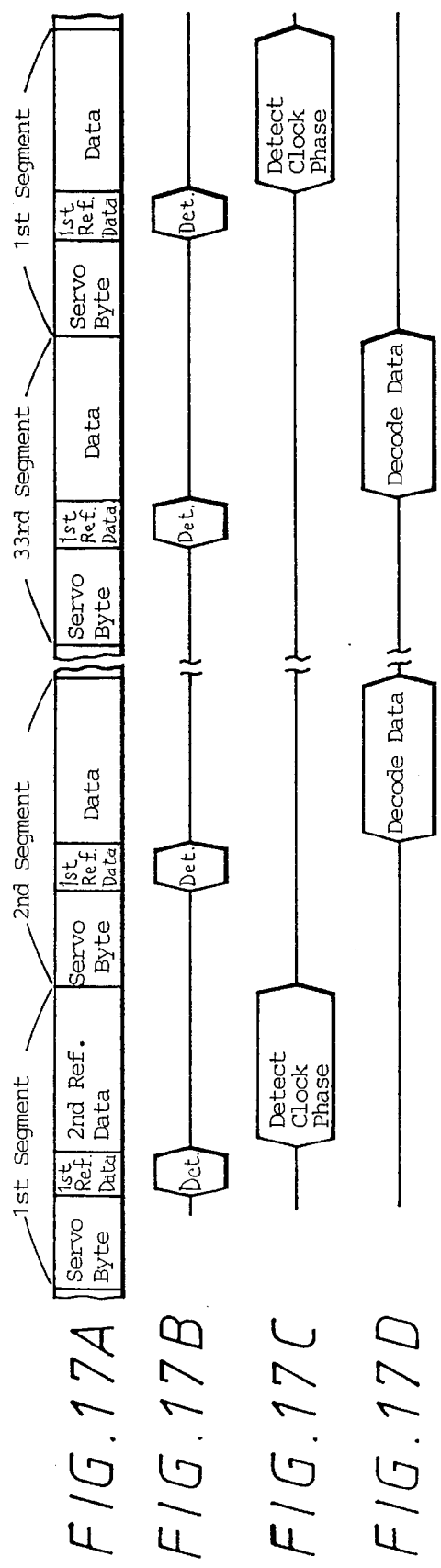

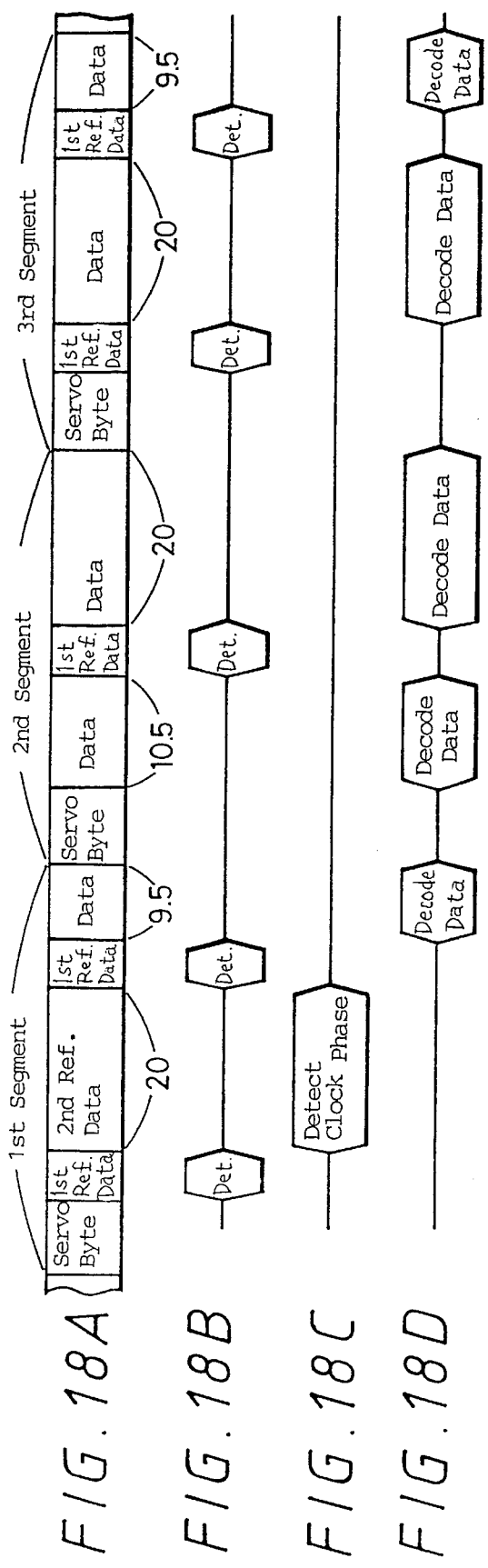

DISC RECORDING METHOD

This is a continuation of application Ser. No. 07/969,144, filed as PCT/JP92/00771, Jun. 17, 1992 published as WO92/22898, Dec. 23, 1992 now abandoned.

TECHNICAL FIELD

The present invention relates to a disc recording method and, more particularly, to a disc recording method for use with a magneto-optical disc.

BACKGROUND ART

As a method for controlling a rotational speed of a disc-shaped recording medium when data is recorded and reproduced, there are known a constant angular velocity (CAV) control method in which data is recorded and reproduced at a constant rotational speed and a constant linear velocity (CLV) control method in which data is recorded and reproduced at a constant linear velocity. Comparing these two kinds of control methods, in the case of the constant angular velocity control method, the revolution rate per unit time is constant so that the speed can be controlled relatively easily. Also, control data such as a track address or the like are recorded on the same position in the diametrical direction so that the address search can be carried out with ease. On the other hand, in the case of the constant linear velocity control method, the rotational speed must be changed in response to the position of an optical pickup in the diametrical direction so that a speed control system becomes complicated. However, the recording density can be made constant and therefore the amount of recording information can be increased over that of the constant angular velocity control method. However, the recording position of the control data such as the track address or the like is changed at every track. There is then the disadvantage such that the address search becomes cumbersome.

In general, in most of the magneto-optical disc having large data recording capacity, in order to search necessary data with ease, data is recorded and reproduced by the constant angular velocity method in which the address search can be made with ease. However, as described above, the constant angular velocity control method is small in recording capacity as compared with the constant linear velocity control method. Therefore, as a method of increasing the recording capacity when data is recorded by the constant angular velocity control method, there is proposed a zoning recording method.

FIGS. 1 and 2 show the condition such that the recording capacity is increased by this zoning method. FIG. 1 shows the example that the zoning recording is effected under the condition that the magneto-optical disc is divided into three zones A, B and C. FIG. 2 shows the example such that the zoning recording is effected under the condition that the magneto-optical disc is not divided into the zones (in the case of the constant angular velocity control method). In these examples, data is recorded on the discs in the form of pits. When the zoning recording is effected as shown in FIG. 1, the recording linear densities of innermost peripheral tracks T11, T21 and T31 of the respective zones A, B and C are set to be the same. Within the respective zones A, B and C, the constant angular velocity control is effected (if the zone is changed, then a recording data clock frequency is changed) so that the recording linear density is lowered in the tracks of the outer peripheral side within the zone. If the magneto-optical disc is divided into a plurality of zones as described above, the linear recording density of one track can be returned to the highest condition each time the zone is changed. Thus, as compared with the case where the linear recording density is sequentially lowered to the outermost peripheral track when the magneto-optical disc is not divided into the zones as shown in FIG. 2, the recording capacity can be increased considerably. That is, although the outermost peripheral track provided when the magneto-optical disc is not divided into the zones is extremely low in linear recording density, if the magneto-optical disc is divided into a plurality of zones, then a sufficiently high linear recording density can be obtained even in the outermost peripheral track. In this case, by increasing the number of zones, the recording capacity can be increased much more.

However, when the zoning recording is effected as described above, the control operation such as to extract a clock or the like in the playback mode must be switched at every zone. Therefore, in order to readily extract a reproducing clock or the like when the zone is switched, it is proposed that reference data that is used to detect the quality of a recording signal is recorded at every predetermined interval. However, when the above-mentioned zoning recording is effected in an optical disc of a so-called sample servo system in which servo control data are previously recorded in alignment with the diametrical direction of the disc in the form of convex and concave pits, a data capacity within one segment segmented by servo control data is made different between the respective zones so that the above-mentioned reference data and the recording data are continuously recorded within one segment. However, in the playback mode, after the reference data is reproduced, the playback control is effected on the basis of this reference data so that the playback of the recording data recorded immediately after the reference data becomes unstable.

DISCLOSURE OF INVENTION

In view of the above-mentioned problems, the present invention is made and intends to provide a recording method in which recorded data can be reproduced easily and reliably even when the zone recording is effected.

According to a first aspect of the present invention, there is provided a disc recording method in which a disc on which servo control data are recorded in advance in alignment with the diametrical direction is divided into a plurality of zones along the diametrical direction and digital data having different clock rates are recorded at every zone. In all of the above-mentioned zones, reference data that is used to detect the quality of a recording signal is recorded at all recording data areas of one segment segmented by the servo control data. Therefore, the control based on the reference data can be carried out commonly in each zone and the control in a recording-system circuit and a reproducing-system circuit can be made easy.

According to a second aspect of the present invention, the above-mentioned reference data is employed as a reference signal that is used to control a phase of a data clock upon playback. Thus, the clock phase can be controlled with ease in each zone upon playback.

According to a third aspect of the present invention, the above-mentioned reference data is employed as pattern data having a repetitive constant frequency. Thus, the reference data can be detected with ease.

According to a fourth aspect of the present invention, the above-mentioned reference data is recorded on every sector formed of a predetermined number of segments. Thus, the reference data can be detected with ease.

According to a fifth aspect of the present invention, a rotational angular velocity of the disc is made constant in all of the zones and the recording is effected under the condition that the recording data clock is switched at every zone. Thus, the recording density of the disc can be increased efficiently.

According to a sixth aspect of the present invention, the recording data clock is made constant in all of the zones and the recording is effected under the condition that the rotational angular velocity of the disc is switched at every zone. Thus, the recording density of the disc can be increased efficiently.

According to a seventh aspect of the present invention, there is provided a disc recording method in which a disc on which servo control data is recorded in advance in alignment with the diametrical direction is divided into a plurality of zones in the diametrical direction and digital data having different clock rates are recorded at every zone. In all of the zones, in all of the recording data areas of one segment segmented by at least the servo control data, there are recorded reference data which is used to detect the quality of a recording signal and data which is used to control the zone. Thus, the zone control can be effected easily.

According to an eighth aspect of the present invention, the zone control data are assigned to data representative of the number of whole zones and data representative of the zone running numbers. Thus, the zone control can be made more easily.

According to a ninth aspect of the present invention, the data amount of the above-mentioned reference data is made equal in all of the above-mentioned zones. Thus, the processing of the reference data can be effected commonly in each of the zones and the control becomes easy.

According to a tenth aspect of the present invention, there is provided a disc recording method in which a disc on which servo control data is recorded in advance in alignment with the diametrical direction is divided into a plurality of zones in the diametrical direction and digital data having different clock rates are recorded at every zone. In all of the above-mentioned zones, there are recorded first reference data at every constant recording data amount in order to detect the quality of a recording signal. Also, in all of the above-mentioned zones, there is recorded second reference data that is used to detect the quality of a recording signal in a recording data area of one segment segmented by at least the above-mentioned servo control data. Thus, a satisfactory playback control by using a plurality of reference data becomes possible.

According to an eleventh aspect of the present invention, the first reference data is recorded at every recording data amount of one segment in the innermost peripheral zone of the above-mentioned disc. Thus, the recording of reference data of each zone can be effected under satisfactory control.

According to a twelfth aspect of the present invention, the data amount of the second reference data is made the same as the above-mentioned constant recording data amount. Thus, the recording control of the reference data can be made with ease in any of the zones.

According to a thirteenth aspect of the present invention, the first reference data is data that is used to adjust a gain upon playback and the second reference data is data that is used to adjust a clock phase upon playback. Thus, the gain adjustment and the clock phase adjustment upon playback can be carried out satisfactorily in any of the zones on the basis of the reference data.

BRIEF DESCRIPTION OF DRAWINGS

FIGS. 17A–17D illustrate a timing chart used to explain the third embodiment; and FIGS. 18A–18D illustrate a timing chart used to explain the third embodiment.

BEST MODE FOR CARRYING OUT THE INVENTION

A first embodiment of the present invention will hereinafter be described with reference to FIGS. 3 to 12.

Figure 1:
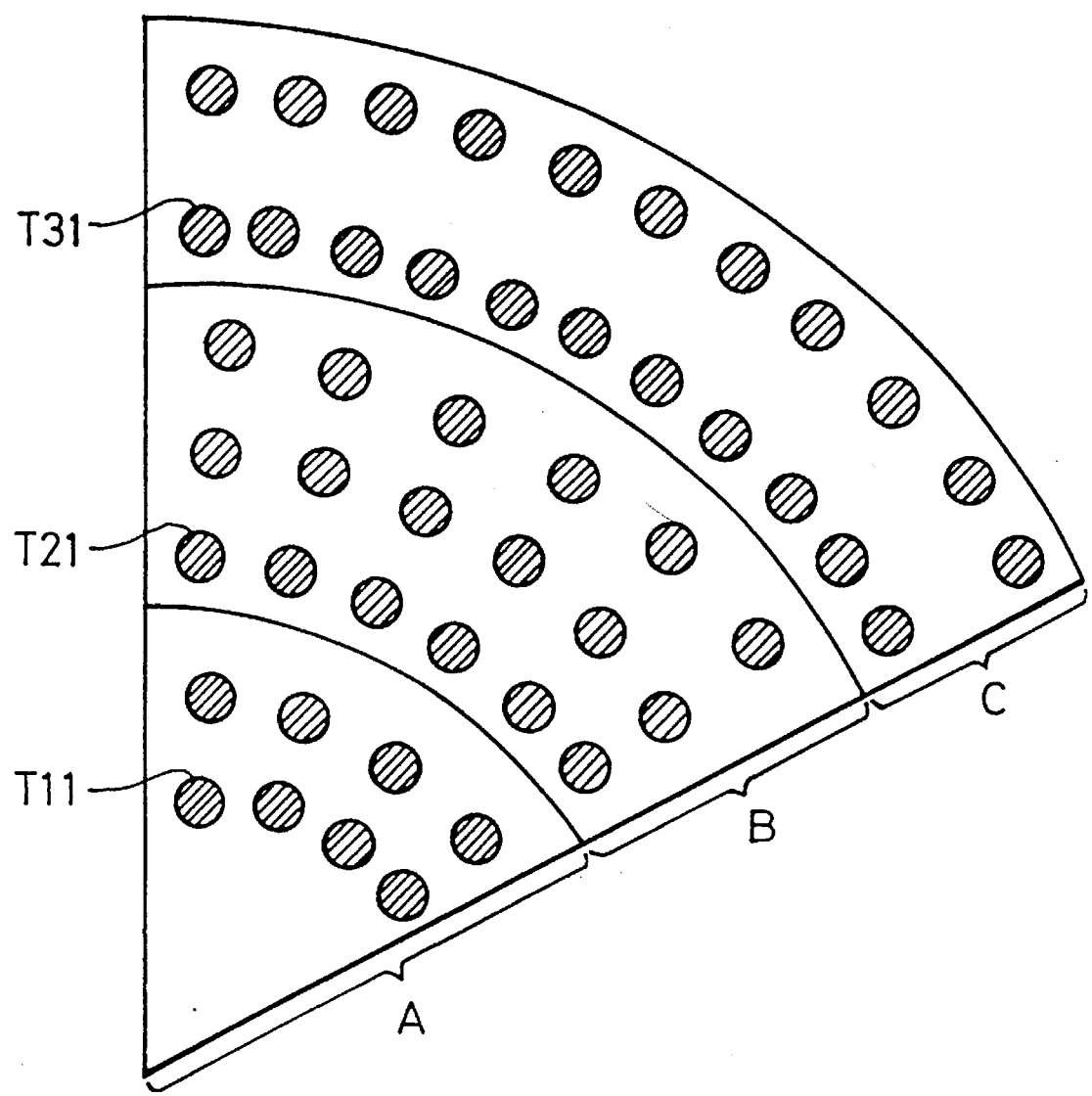
FIG. 1 is a schematic diagram used to explain the zoning recording.
Figure 2:
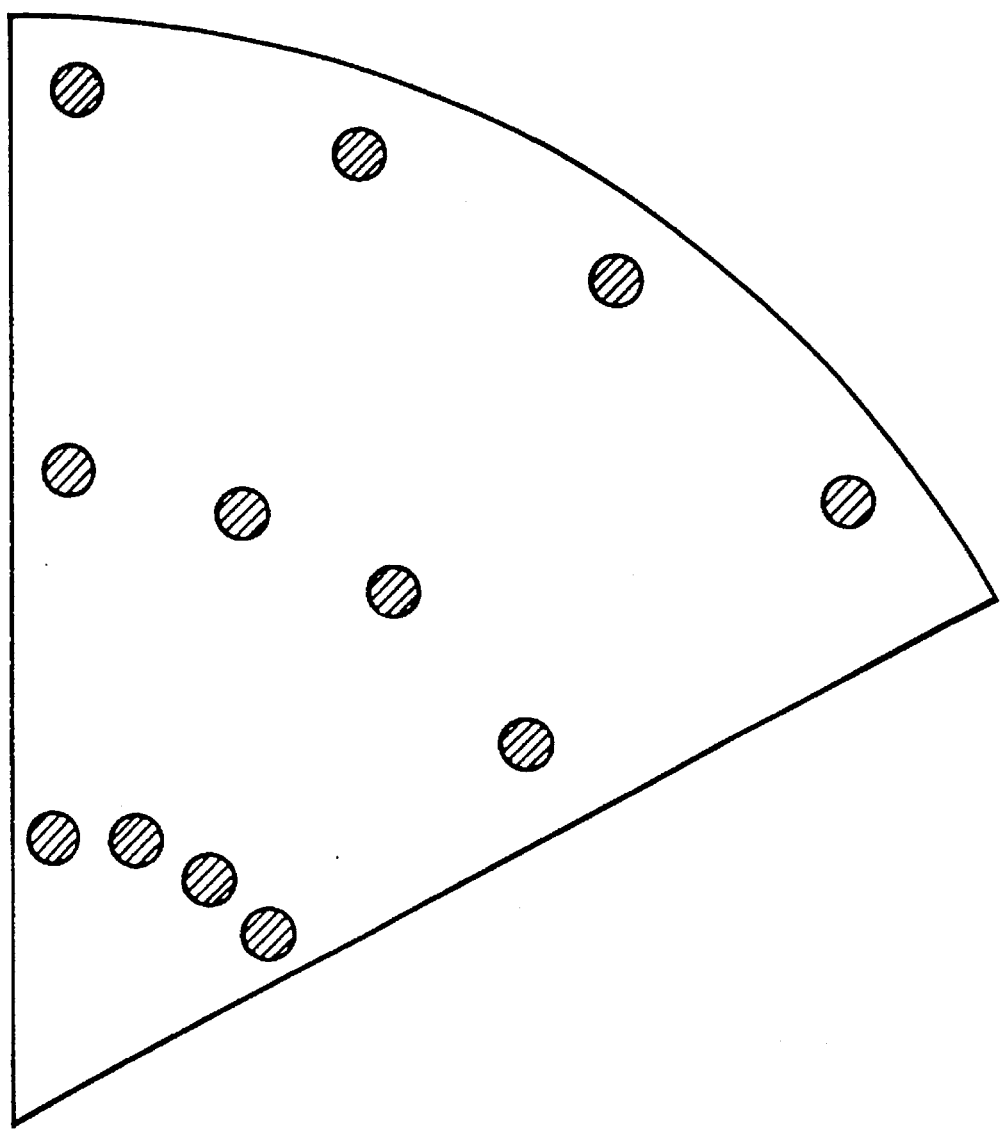
FIG. 2 is a schematic diagram used to explain the zoning recording.
Figure 3:
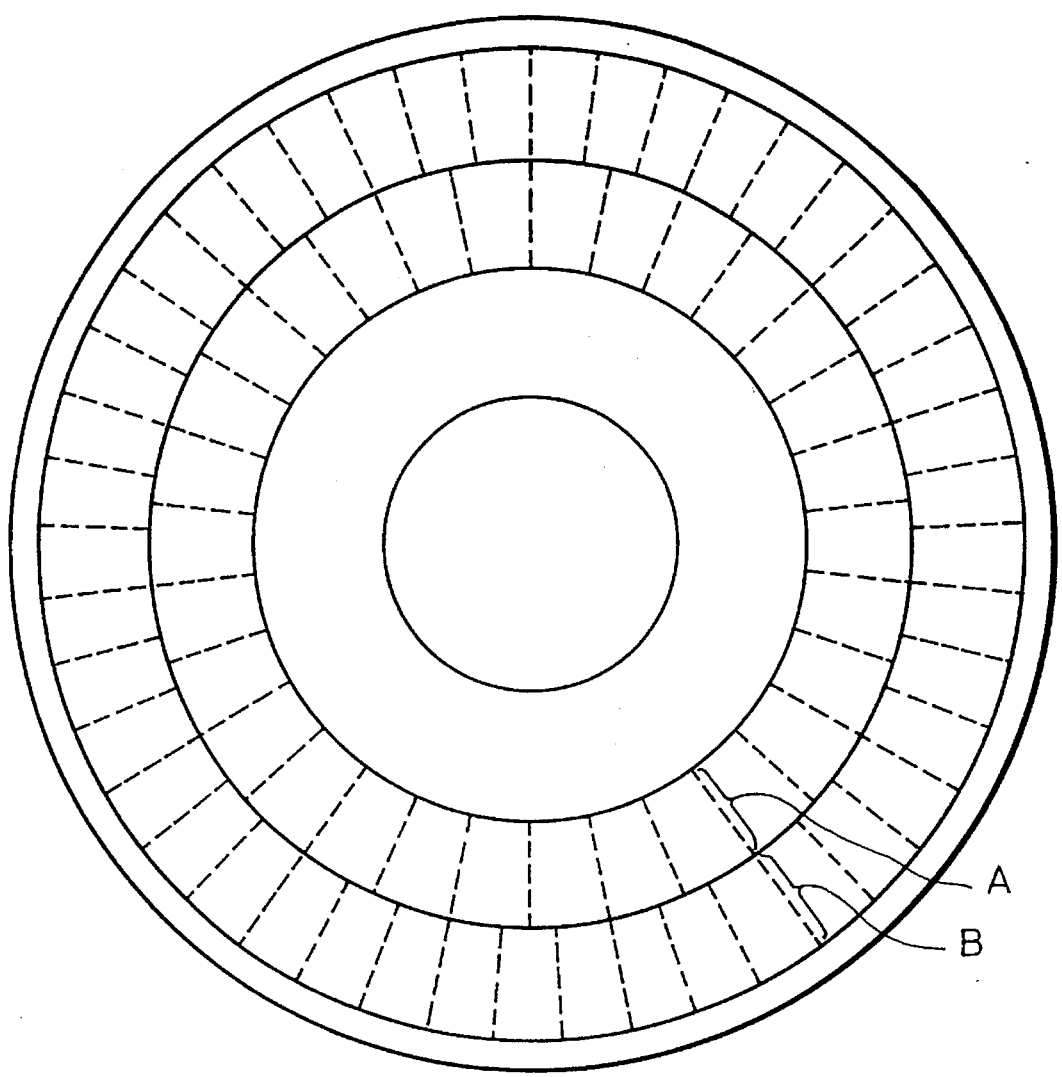
FIG. 3 is a diagram of a structure of a recording medium according to a first embodiment of the present invention.

In this embodiment, the present invention is applied to a magneto-optical disc in and from which data can be recorded and reproduced freely, and the magneto-optical disc is recorded in a zoning recording fashion as shown in FIG. 3. More specifically, on one magneto-optical disc, there are formed a plurality of concentric tracks. The magneto-optical disc is halved into a zone A formed of tracks near the center of the magneto-optical disc and a zone B formed of tracks near the outer peripheral tracks of the magneto-optical disc. In this case, when the radius of the magneto-optical disc is selected to be 32 mm, a range of the zone A falls within a radius of 16 mm to 22 mm and a range of the zone B falls within a radius of 22 mm to 30 mm. Within each of the zones, data is recorded and reproduced at a constant rotational angular velocity, and a recording data clock frequency for recording and reproducing is changed in the zones A and B (recording data clock frequency is higher in the zone B).

Figure 4:
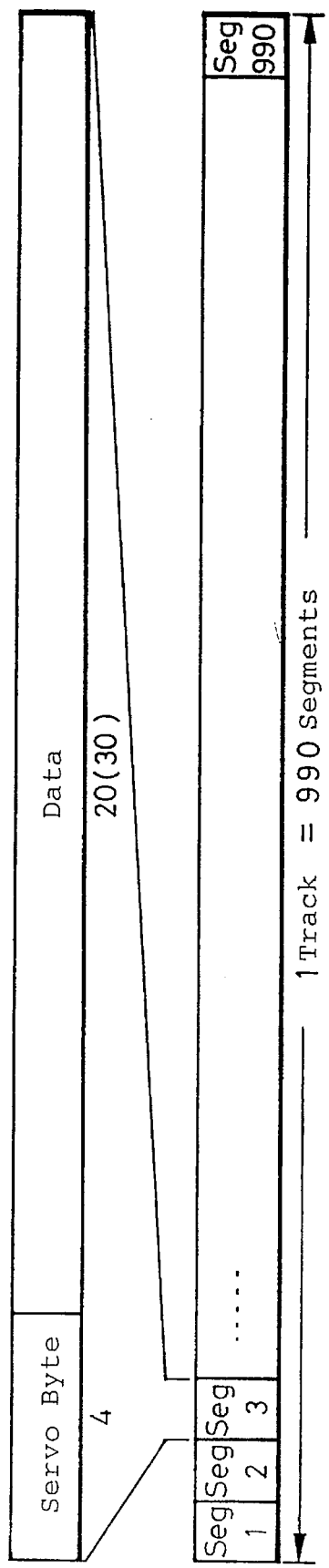
FIG. 4 is an explanatory diagram showing a format of each track according to the first embodiment.

One track of annular tracks within the respective zones A, B is formed of 990 segments as shown in FIG. 4. In this case, the segment of one unit is formed of a servo byte area of 4 bytes and a recording data area of 20 bytes (zone A) or 30 bytes (zone B). The 4-byte servo byte at the header portion of each segment is employed as a so-called pre-pit in which data is recorded on the disc in the form of pits. Upon recording and reproducing, a sample servo control is effected by data recorded on this pre-pit. Further, a track address and a sector address are recorded by the data from this pre-pit and then utilized upon access. On the recording data area of 20 bytes or 30 bytes following the servo byte area, there is recorded data by a circuit whose circuit configuration will be described later owing to a magneto-optical effect. A difference of recording capacity between 20 bytes and 30 bytes is caused by a difference between the recording data clock frequencies of the zones A and B. That is, by the zoning recording, the linear recording density of the innermost peripheral track of the zone A and the linear recording density of the innermost peripheral track of the zone B are set to be substantially the same. Accordingly, the recording capacity of the recording data area is changed at every zone in response to the length of the whole periphery of the innermost peripheral track of the zone.

Figure 5:
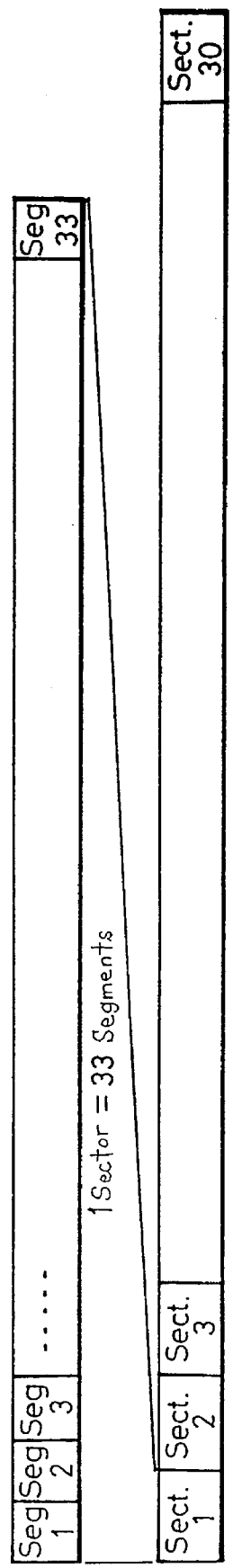
FIG. 5 is an explanatory diagram showing a track format of a zone A according to the first embodiment.
Figure 6:
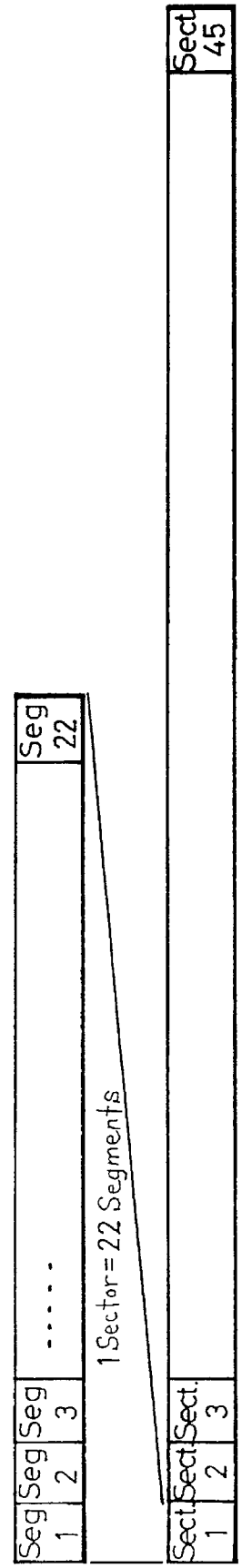
FIG. 6 is an explanatory diagram showing a track format of a zone B according to the first embodiment.

In the case of the zone A, as shown in FIG. 5, one sector is formed of 33 segments and one track forms 30 sectors. In the case of the zone B, as shown in FIG. 6, one sector is formed of 22 segments and one track forms 45 sectors. In this case, positions of the sectors are in alignment with one another within the respective zones. Accordingly, as shown by dashed lines in FIG. 3, boundary portions of the respective sectors exist within the respective zones in a radial fashion.

Figure 7:
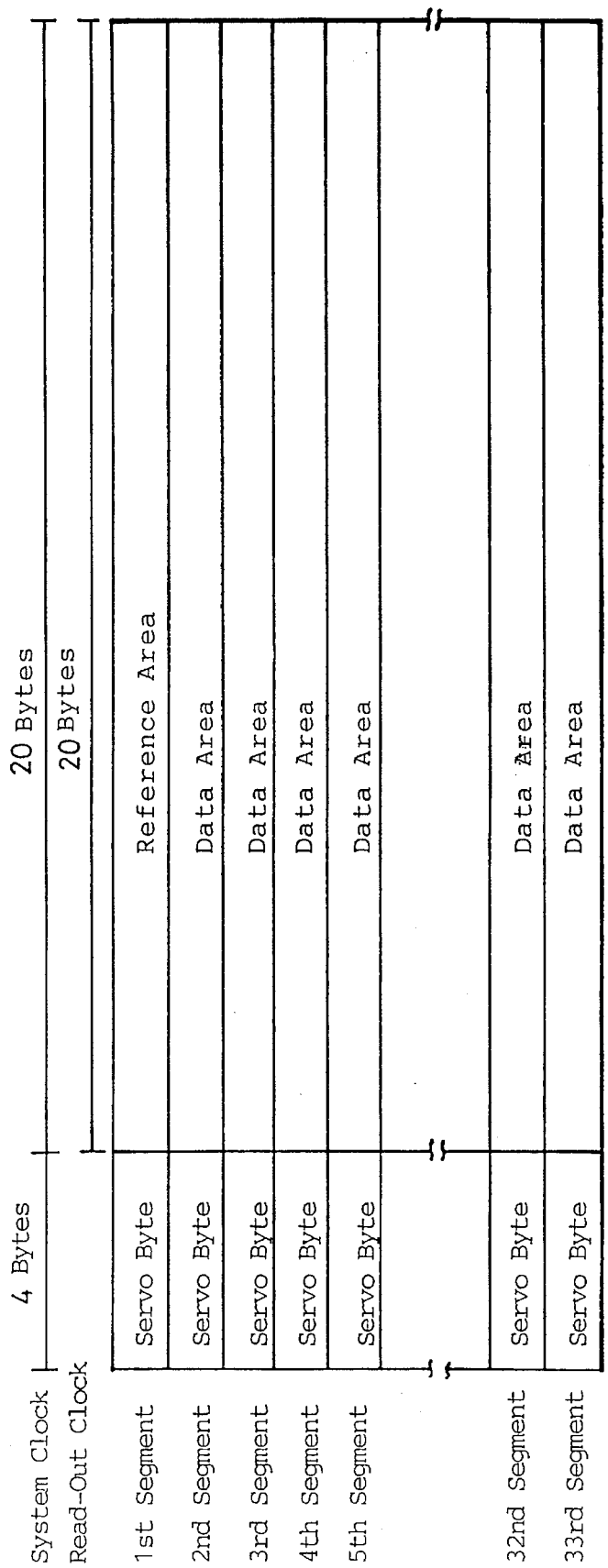
FIG. 7 is an explanatory diagram showing a data format of the zone A according to the first embodiment.

When data is recorded, the recording is carried out in the unit of sectors. The structures of the respective sectors will be described. In the case of the zone A, as shown in FIG. 7, a recording data area of the first segment (first segment) within 33 segments constituting one sector is assigned to a reference area in which reference data (reference data) of 20 bytes is recorded when data is recorded on this sector. This reference data is used to detect the quality of a recording signal upon playback. To be more concrete, a signal of a constant frequency is recorded. Upon playback, a playback level of this reference data is detected to adjust the gain and the system clock and the reproduced data are matched with each other in synchronization. Then, the reference data is recorded on the whole interval of the recording data area of the first segment. In the recording data area from the second segment to 33rd segment, data of 20 bytes each is recorded on each segment.

Accordingly, in the case of the zone A, the reference data of 20 bytes and various data of 640 bytes (20 bytes×32 segments) are recorded on one sector.

Figure 8:
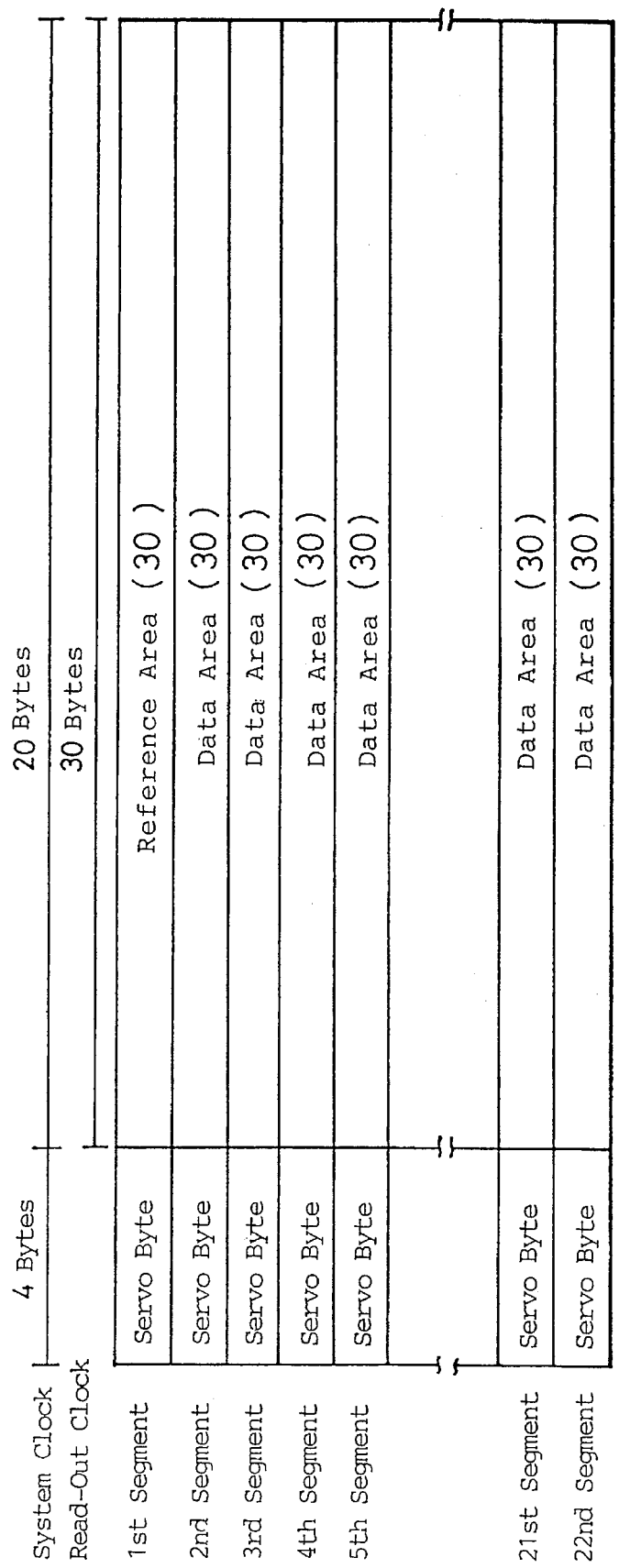
FIG. 8 is an explanatory diagram showing a data format of the zone B according to the first embodiment.

In the case of the zone B, as shown in FIG. 8, a recording data area of the first segment (first segment) within 22 segments constituting one sector is assigned to the reference area in which reference data of 30 bytes is recorded when data is recorded on this sector. The reference data of the zone B is similar to the reference data of the above-mentioned zone A and recorded on the whole interval of the recording data area of the first segment. Data of 30 bytes each is recorded on the respective segments of the recording data area from the second segment to 22nd segment.

Therefore, in the case of the zone B, the reference data of 30 bytes and various data of 630 bytes (30 bytes×21 segments) are recorded on one sector.

As described above, the zones A and B are substantially the same in recording capacity of one sector and the zone B has a large recording capacity of one track because it has many sectors of each track.

A recording and reproducing apparatus for the magneto-optical disc in which the respective tracks are formed as described above will be described next.

Figure 9:
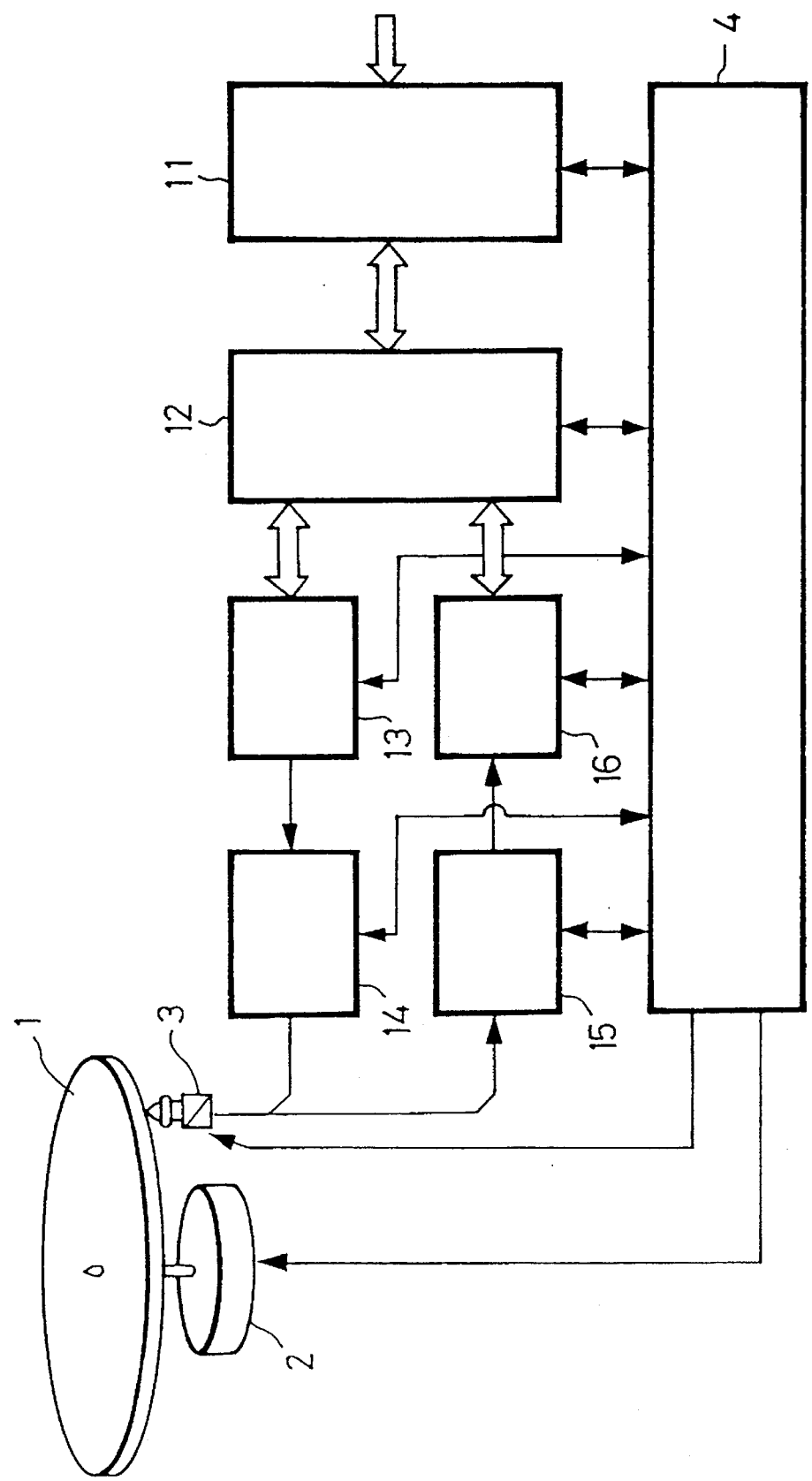
FIG. 9 is a block diagram showing a recording and reproducing apparatus according to the first embodiment.

FIG. 9 is a diagram showing a circuit arrangement of a recording and reproducing apparatus for a magneto-optical disc to which the present invention is applied. Reference numeral 1 depicts a magneto-optical disc. On this magneto-optical disc 1, there is effected the zoning recording in which the recording is effected on the magneto-optical disc under the condition that it is divided into two zones of zones A and B as shown in FIG. 3. The magneto-optical disc 1 is rotated by a spindle motor 2 and recorded and reproduced by an optical pickup 3 which incorporates therein a semiconductor laser or the like. A rotation control of the spindle motor 2 and various controls (seek control, etc.) of the optical pickup 3 are effected by a system controller 4 formed of a microcomputer.

Data recorded on this magneto-optical disc 1 is supplied from a recording data forming circuit (not shown) to a RAM control circuit 11 and then temporarily stored in a RAM 12 under the control of the RAM control circuit 11. The data thus stored is supplied from the RAM 12 to a modulating circuit 13 at a predetermined timing. The modulating circuit 13 modulates the data for recording and the recording data thus modulated is supplied to a write circuit 14. Then, this data is processed by this write circuit 14 in a predetermined write processing fashion. The recording data thus processed is supplied to the optical pickup 3 and is thereby recorded owing to the magneto-optical effect.

The data thus written in the magneto-optical disc 1 is read out by the optical pickup 3 and then supplied to a read-out circuit 15. Then, the data, processed by the read-out circuit 15 in a predetermined read-out processing fashion, is supplied to a demodulating circuit 16. The data thus demodulated for playback by the demodulating circuit 16 is temporarily stored in the RAM 12. Then, the data thus stored in the RAM 12 is read out under the control of the RAM control circuit 11 and then supplied to a reproduced data output circuit (not shown) side.

Figure 10:
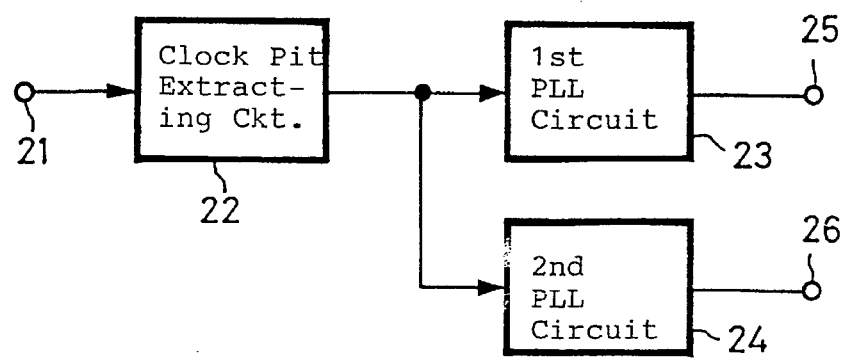
FIG. 10 is a block diagram showing a main portion of the recording and reproducing apparatus according to the first embodiment.
Figure 11:
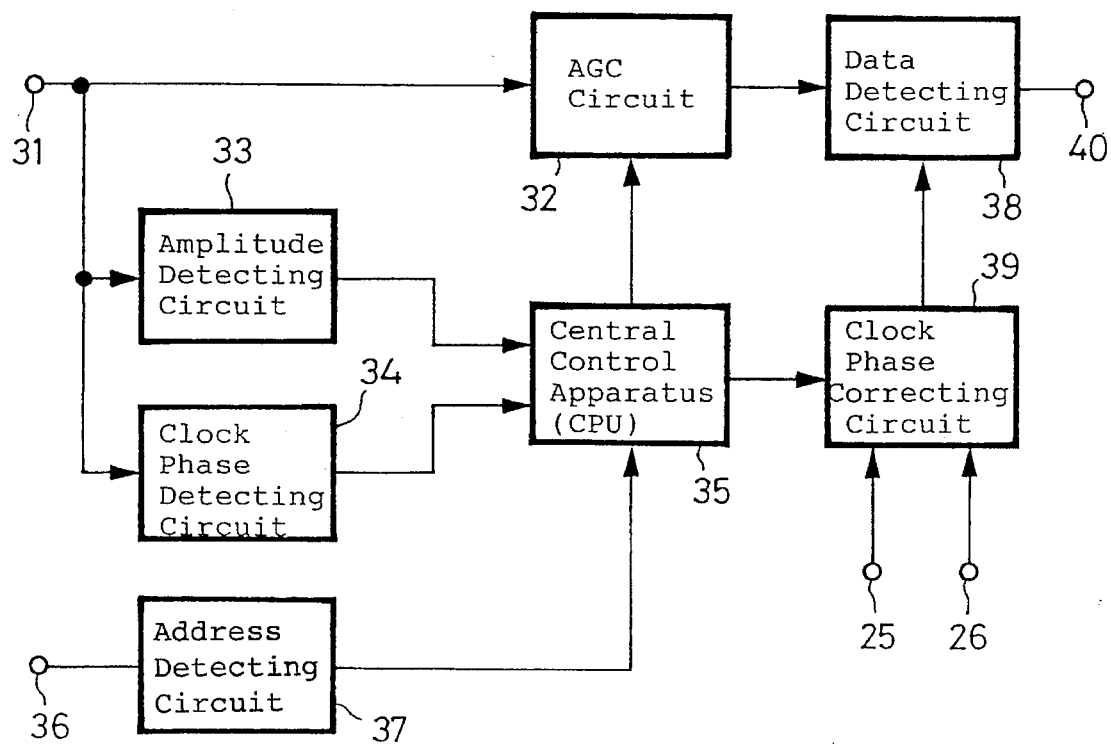
FIG. 11 is a block diagram showing a main portion of the recording and reproducing apparatus according to the first embodiment.

The detailed circuit arrangements of the read-out circuit 15 required in the playback mode and the peripheral circuits are illustrated in FIGS. 10 and 11. In this embodiment, the magneto-optical disc 1 is recorded in a zoning recording fashion in which it is divided into two zones and therefore two kinds of read-out clocks are required. That is, FIG. 10 shows a circuit arrangement of a clock generating circuit. The reproduced signal supplied to the read-out circuit 15 and applied to a terminal 21 is supplied to a clock pit extracting circuit 22 and the servo byte data is extracted by this clock pit extracting circuit 22. The servo byte data thus extracted is supplied to a first PLL circuit (phase locked loop circuit) 23 and a second PLL circuit 24. In this case, the first PLL circuit 23 converts the input data into a signal having a frequency 192 times as high as that of the original frequency. The signal having the frequency 192 times as high as that of the original one is supplied to a terminal 25 as a data detection clock of the zone A. Also, the second PLL circuit 24 converts the input data into a signal having a frequency (192×1.5) times, i.e., 288 times as high as that of the original one. Then, the signal having the frequency 288 times as high as that of the original one is supplied to a terminal 26 as a data detection clock of the zone B.

A circuit arrangement of the read-out circuit 15 which extracts reproduced data on the basis of the thus formed clocks is illustrated in FIG. 11. The reproduced signal supplied to the read-out circuit 15 and applied to a terminal 31 is supplied to an AGC circuit (automatic gain control circuit) 32, an amplitude detecting circuit 33 and a clock phase detecting circuit 34. A reproduced amplitude of the reference data is detected by the amplitude detecting circuit 33 and a reproduced phase of the reference data is detected by the clock phase detecting circuit 34. Detection data of both the detection circuits 33, 34 are supplied to a central control apparatus (CPU) 35 that is used to control the read-out. On the basis of the amplitude detection data supplied thereto, the central control apparatus 35 controls an amount in which a gain of a reproduced signal is adjusted by the AGC circuit 32. Further, the central control apparatus forms correction data of read-out clock correction data on the basis of the clock phase detection data supplied thereto and supplies this correction data to a clock phase correcting circuit 39. The clock phase correcting circuit 39 phase-adjusts (phase-shifts) the data detection clocks obtained at the terminals 25 and 26 on the basis of the correction data and supplies any one of the thus adjusted clocks to a data detecting circuit 38.

In this case, the clock supplied from the clock phase correcting circuit 39 to the data detecting circuit 38 is selected in response to the zone of the reproduced portion of the disc. More specifically, when the zone A is reproduced, the clock output from the first PLL circuit 23 is phase-corrected and then supplied to the data detecting circuit 38. When the zone B is reproduced, the clock output from the second PLL circuit 24 is phase-corrected and then supplied to the data detecting circuit 38. Therefore, when the track of the zone A is reproduced, as shown in FIG. 7, reproduced data of servo byte is multiplied by 192 by the first PLL circuit 23 to provide a system clock and the signal having the original frequency becomes a read-out clock. Further, when the track of the zone B is reproduced, as shown in FIG. 8, the reproduced data of servo byte is multiplied by 192 by the first PLL circuit 23 to provide a system clock that is used to effect the control based on the servo byte. Also, the reproduced data of servo byte is multiplied by 288 by the second PLL circuit 24 to provide a read-out clock.

Then, the data detecting circuit 38 is supplied with the reproduced signal whose gain is adjusted by the AGC circuit 32, and decodes data recorded on the disc from the reproduced signal on the basis of the clock supplied thereto from the clock phase correcting circuit 39. The data thus decoded is supplied through a terminal 40 to a circuit of the succeeding stage as reproduced data. Further, a terminal 36 is such a terminal which is supplied with reproduced data of data recorded as a pit, that is, a servo byte and a reproduced signal obtained at the terminal 36 is supplied to an address detecting circuit 37. An address data decoded by the address detecting circuit 37 is supplied to the central control circuit 35 and this central control apparatus 35 judges a track or sector which is being reproduced at present by the address data.

Figures 12A, 12B, 12C, 12D, 12E:
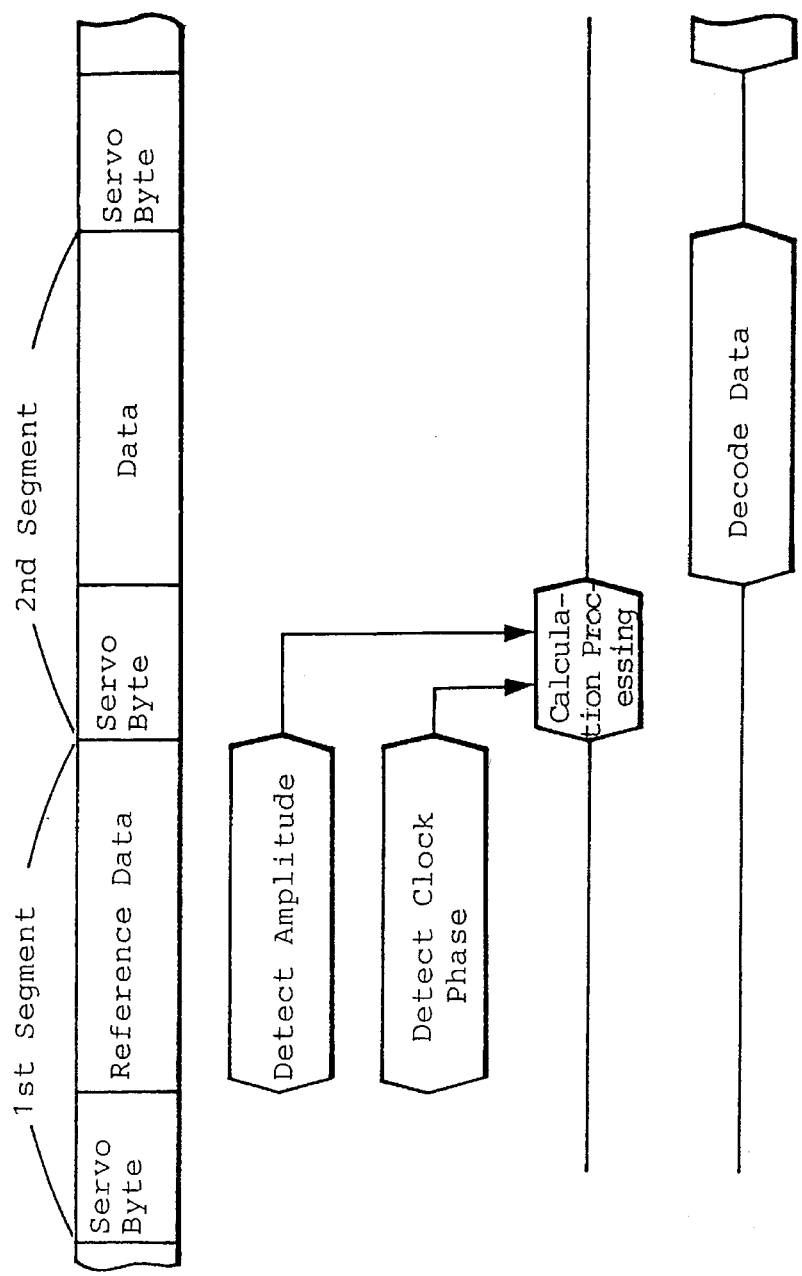
FIGS. 12A–12E illustrate a timing chart used to explain the first embodiment.

When the data recorded on the magneto-optical disc 1 is reproduced by the circuit thus arranged, the processing is carried out at the timings shown in FIGS. 12A–12E. That is, as shown in FIG. 12A, during the reference data of the first segment of each sector is being reproduced, a reproduced amplitude of the reference data is detected by the amplitude detecting circuit 33 as shown in FIG. 12B. Also, the reproduced phase of the reference data is detected by the clock phase detecting circuit 34 as shown in FIG. 12C. Then, when the servo byte of the second segment is being reproduced, as shown in FIG. 12D, the reproduced amplitude and the reproduced phase are judged by the central control apparatus 35 to thereby control the gain adjustment amount of the AGC circuit 32 and the phase correcting amount of the clock phase correcting circuit 39. Then, under the condition that the gain adjustment and the phase correction are carried out as described above, as shown in FIG. 12E, the data recorded on the data area from the second segment is decoded. A sample servo control is effected at every segment on the basis of the data reproduced from the servo byte of each segment.

When the reference data is reproduced by reproducing the next sector, the gain adjustment and the re-adjustment (recorrection) of the phase correction are similarly carried out on the basis of the reference data, whereby the adjustment (correction) of the reproduced state based on the reference data is carried out at every sector.

In this case, according to this embodiment, since the reference data is recorded on the whole interval of the first segment of each sector except the servo byte even though the reproduced track is any one of the zones A and B, as shown in FIG. 12, the data processing is carried out at the unit of segment and the reproducing processing can be carried out reliably under simple control.

That is, the recording capacity of the servo byte is 4 bytes both in the zones A and B, whereby the timing control (switching control of servo byte and data area, etc.) of the playback processing can be carried out in any zone by using the system clock formed by the first PLL circuit 23 on the basis of the 4-byte reproduced data. Therefore, according to this embodiment, in spite of the zoning recording, the timing control such as the switching of the servo byte and the data area or the like can be carried out commonly in the respective zones. In this case, since the recording state of the reference data is made at the unit of segment, the reference data detection timing also is made the same in the respective zones. Therefore, the control shown in FIG. 12 can be carried out at the same timing in any zone so that the playback processing utilizing the reference data can be carried out with ease.

When the above-mentioned zoning recording is effected, it is desired that an information concerning the zoning can be obtained upon playback.

Figure 13:
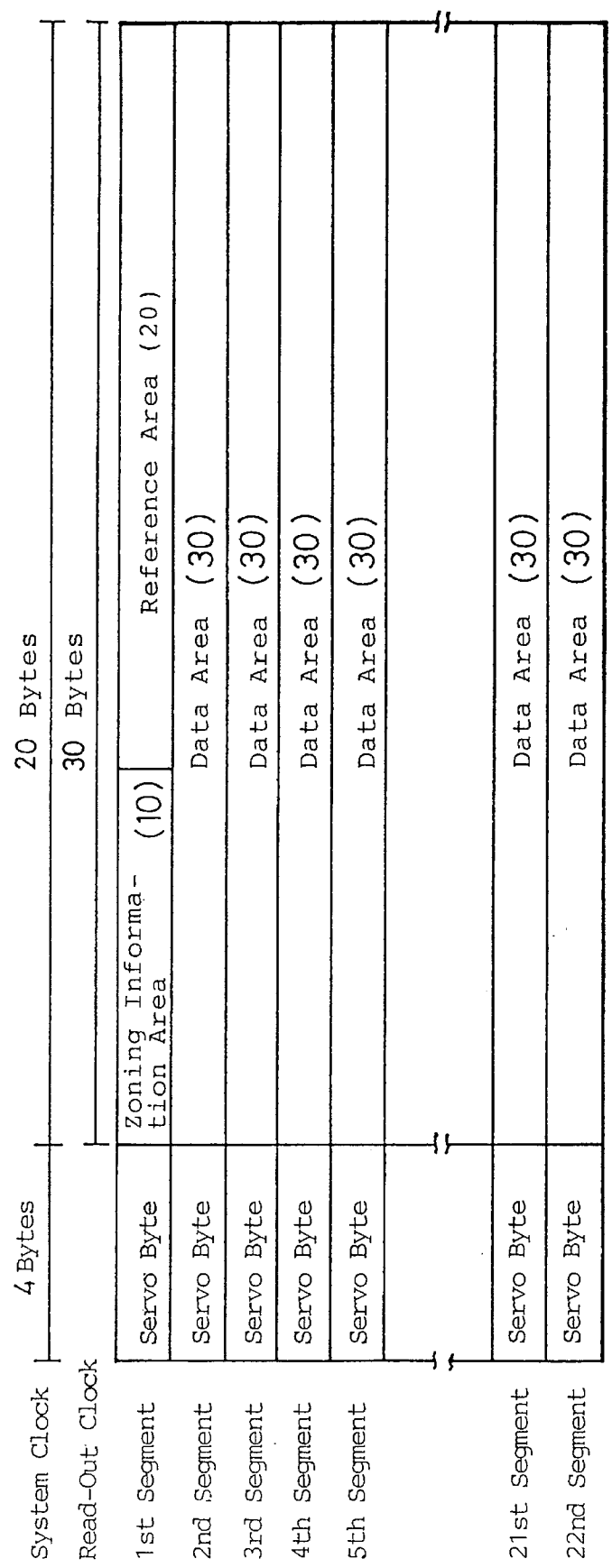
FIG. 13 is an explanatory diagram showing a data format of the zone B according to a second embodiment.

Accordingly, in the case of the zone B, the recording may be effected as shown in FIG. 13. More specifically, a ⅓ of the first half of the recording data area of the first segment (first segment) of 22 segments constituting one sector is assigned to a zoning information area having a capacity of 10 bytes on which zone control data concerning the zoning recording of maximum 10 bits is recorded at a low recording density (i.e., ⅛ of the normal recording density) where one-byte area is employed as one bit, when data is recorded on this sector. A ⅔ of the second half of the data area of the first segment following this zoning information area is assigned to a reference area on which 20-byte reference data is recorded when data is recorded on this sector. The reference data of the zone B is similar to the reference data of the zone A. Then, in the data area from the second segment to the 22nd segment, data of 30 bytes each is recorded on the respective segments.

Therefore, in the case of the zone B, 10-byte zone control data (in actual practice, 10-bit data by lowering the recording density to ⅛), 20-byte reference data and various data of 630 bytes (30 bytes×21 segments) are recorded by one sector.

Figure 14:
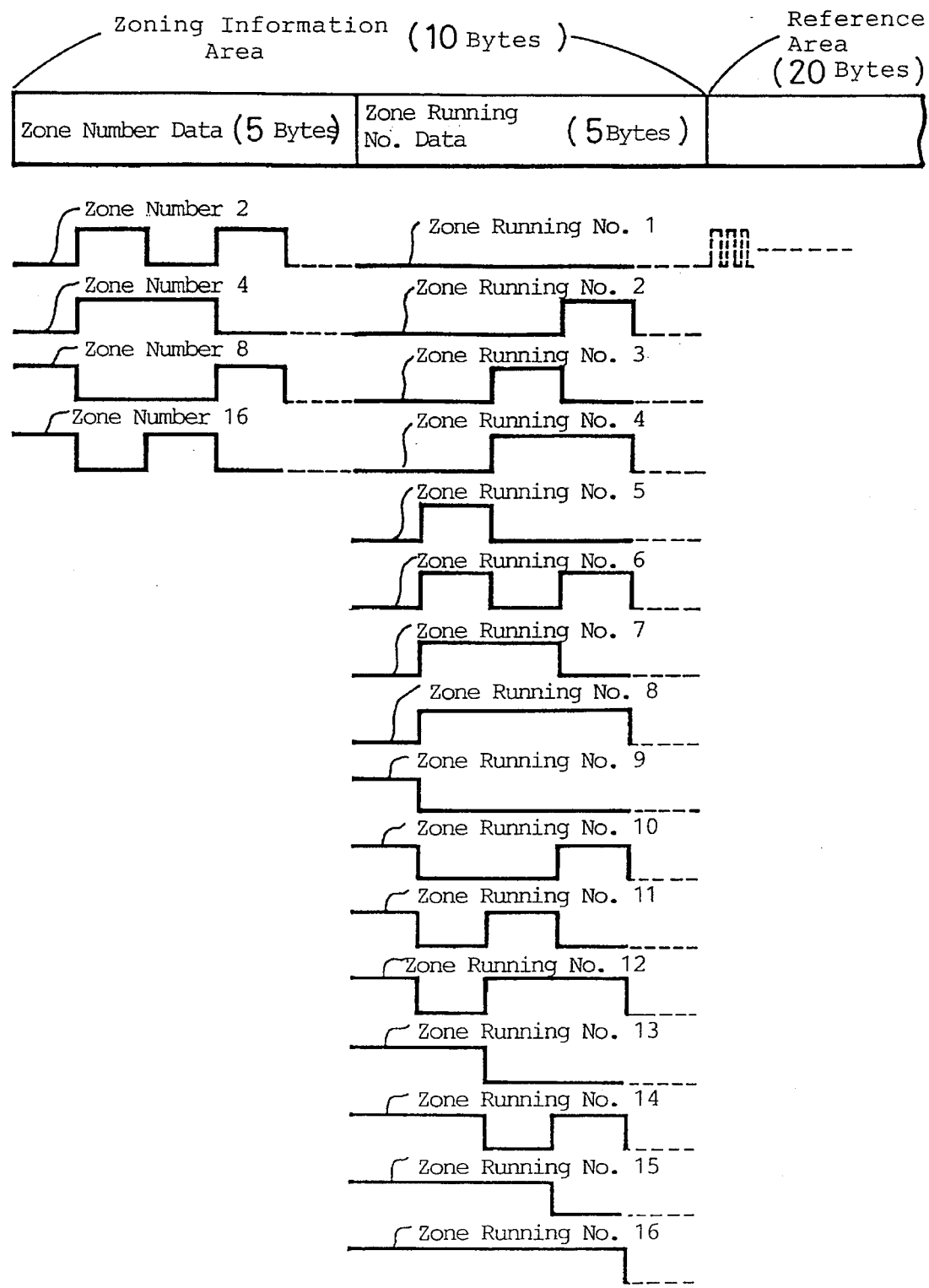
FIG. 14 is an explanatory diagram showing an example of a data format of a zoning information area according to the second embodiment.

An example of data recorded on the zoning information area of the first segment of each sector in the case of the zone B is illustrated in FIG. 14. According to this embodiment, zone control data up to 10 bits is recorded on the zoning information area having a recording capacity of 10 bytes at a low recording density in which the area of one byte is employed as one bit. Data representative of the number of zones is recorded on the 5-byte area of the first half of the zoning information area and zone running No. data is recorded on the second half 5 byte area. As the data representative of the number of zones, there is recorded data that represents the number of divided zones of this disc. When the zone is halved as, for example, shown in FIG. 3, data representative of the zone number 2 is recorded. In this case, since data up to 5 bits can be recorded, zone number data of 32 kinds at maximum can be recorded. The example of FIG. 14 shows the examples of data in the condition such that there are recorded four kinds of data of zone numbers 2, 4, 8 and 16. In this case, the above data can be recorded by 4 bits and other data can be recorded by remaining one bit.

As the zone running No. data, there is recorded data that represents the zone to which the sector in which this data is recorded belongs. When the zone is halved as, for example, shown in FIG. 3, the zone running No. 1 (in the case of the zone A) or zone running No. 2 (in the case of the zone B) is recorded. In the case of the zone A, only the zone running No. 2 is recorded on the zone B because it has no zoning information area in actual practice. In this case, since data up to 5 bits can be recorded, zone running No. data of 32 kinds at maximum can be recorded. In the example of FIG. 14, there are shown examples of data representative of zone running Nos. 1 to 16. Also in this case, data can be recorded by 4 bits and other data can be recorded by remaining one bit. Then, in the reference area following the zone running No. data recording area, an information of about 8 bits can be recorded on one byte.

According to this embodiment, the zoning information area of the zone B is disposed in front of the reference area so that, even when the reproduced track is any of the zones A and B, after the 20-byte reference data is recorded on the first segment of each sector, only desired data can be recorded on all the data areas. Having neglected the servo byte, the reference data and the desired data are recorded under the common recording state in the respective zones and the common playback control can be effected in the respective zones. Therefore, in spite of the zoning recording, the playback processing can be carried out under simple control.

Further, since the reference area of the zone B in the first segment is formed of 20 bytes similarly to the reference area of the zone A, the zoning information area is prepared in the area of remaining 10 bytes in which zone control data is recorded, a zoning condition and a zone running number of a reproduced portion can be detected from the data of this area, thereby making it possible to perform a playback control corresponding to a reproducing zone. In this case, data to be recorded in the zoning information area is recorded at a low recording density in which data is recorded by one bit each in the area of one byte so that, even when a read-out clock of the reproducing-system circuit is not synchronized with the recording signal, reproduced data can be discriminated sufficiently. There is then no disadvantage that even if such data is recorded in front of the reference data.

While the zoning information area is provided in front of the reference data as described above, the present invention is not limited thereto and the zoning information area may be provided within the same segment following the reference data. In this case, since the zoning information is read out after the synchronization was carried out by the reference data upon reproduction, data need not be recorded at low recording density unlike the above-mentioned embodiments. In this case, however, an arrangement state of the reference data and the desired data (i.e., existence of zoning information between both data) is different in zones, which needs a countermeasure therefor.

While the informations representative of the zone number and the zone running number are recorded in the zoning information area as described above, the present invention is not limited thereto and other informations concerning the recording mode may be recorded therein.

According to the respective embodiments set forth above, since a recording data amount of one segment is different in respective zones, it is frequently observed that the handling of data in the recording and reproducing becomes complicated.

Figure 15:
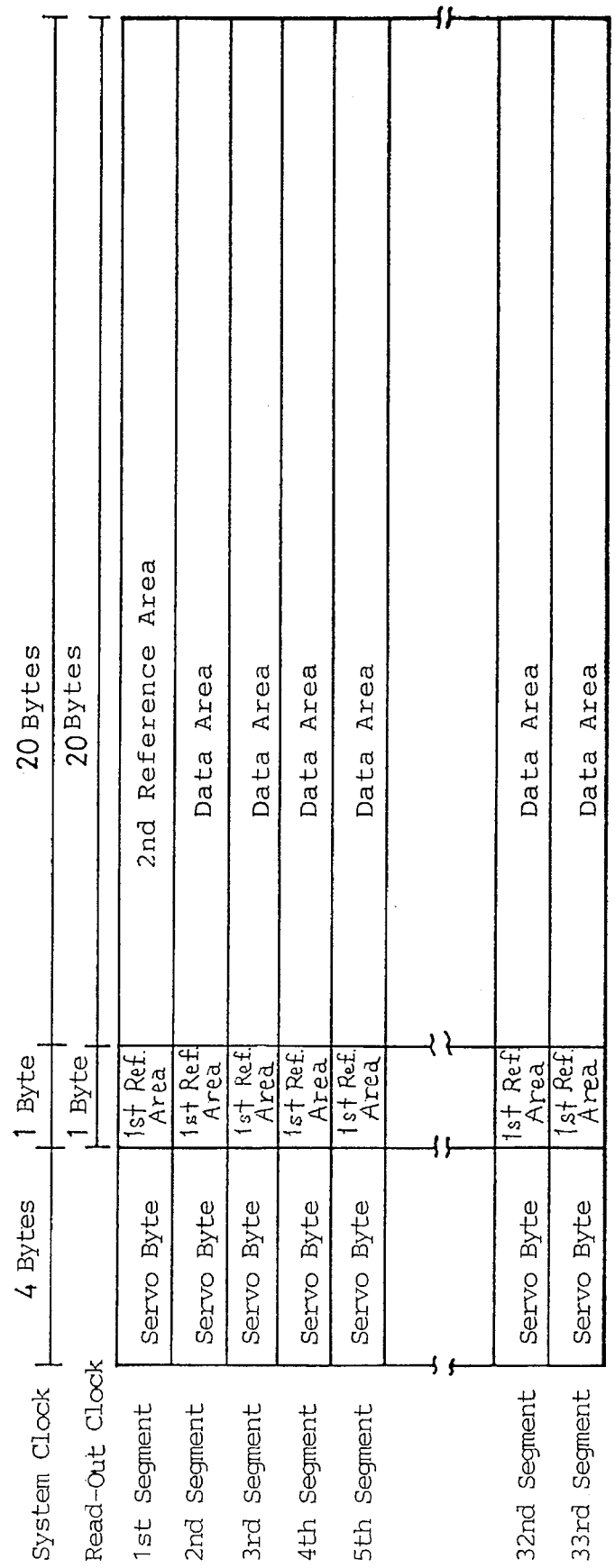
FIG. 15 is an explanatory diagram showing a data format of the zone A according to a third embodiment.

Accordingly, in the case of the zone A, the recording may be made as shown in FIG. 15. That is, one byte of recordable area following the servo byte of each segment is assigned to a first reference area in which reference data for detecting the quality of a recording signal is recorded upon playback. To be more concrete, a signal having a constant frequency is recorded in this area and reference data (hereinafter referred to as first reference data) used to adjust gain upon playback is recorded therein at the same time when data is recorded on the data area. In this case, it is possible that second reference data recorded on a second reference area, which will be described later, and the first reference data recorded on this first reference area may be the same data.

In the case of the first segment of the zone A, a 20-byte area following the first reference area is assigned to the second reference area in which reference data used to adjust phase upon reproduction (hereinafter referred to as second reference data) is mainly recorded at the same time when data is recorded on the data area. The second reference data is used to detect the quality of the recording signal upon playback similarly to the first reference data. Upon playback, a reproduced signal of the reference data and the system clock are matched in synchronization. Then, the area from the second segment to the 33rd segment is assigned to a data area instead of the second reference area and data of 20 bytes each is recorded on each segment.

Accordingly, in the case of the zone A, the first reference data (gain adjustment reference data) of 33 bytes (1 byte×33 segments), the second reference data (phase adjustment reference data) of 20 bytes and various data (desired data) of 640 bytes (20 bytes×32 segments) are recorded on one sector.

Figure 16:
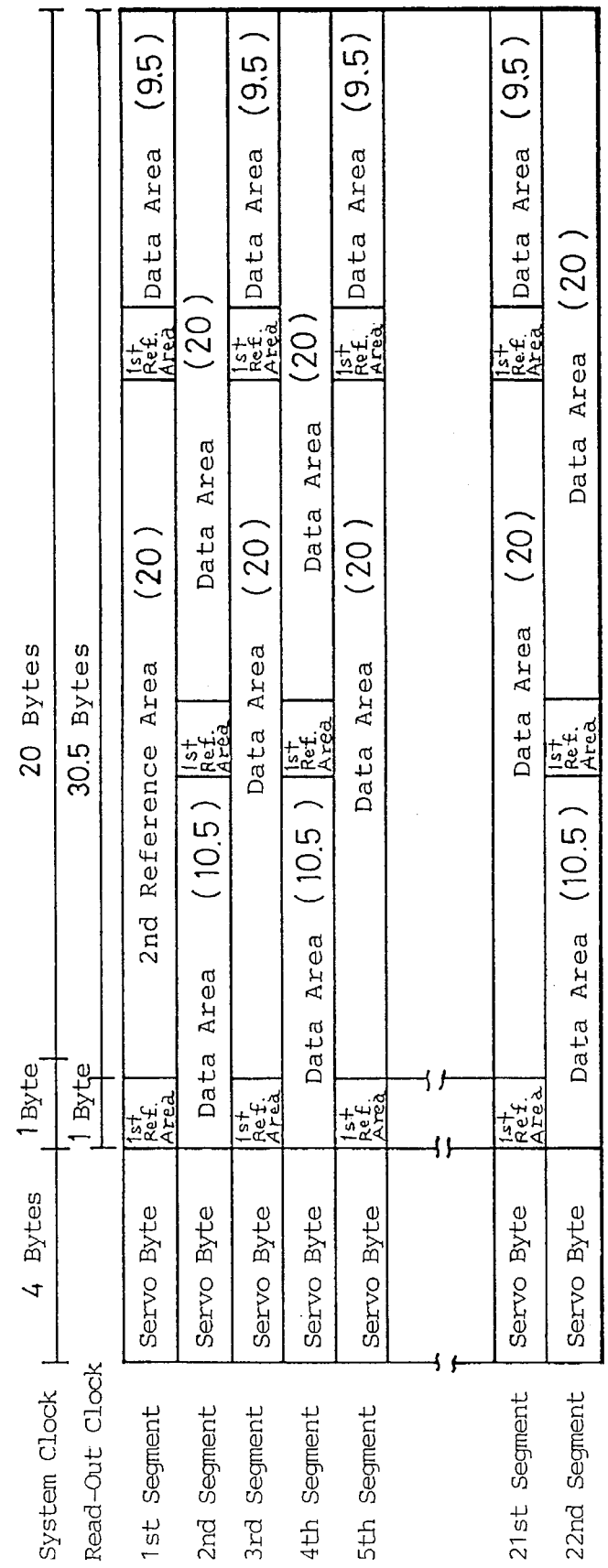
FIG. 16 is an explanatory diagram showing a data format of the zone B according to the third embodiment.

Also, in the case of the zone B, as shown in FIG. 16, in the first segment, a first 1 byte within a 31.5-byte recordable area following the servo byte is assigned to the first reference area, a following 20-byte area is assigned to the second reference area, a following one-byte area is again assigned to the first reference area and a remaining 9.5-byte area is assigned to a data area. In the second segment, a first 10.5-byte area within the 31.5-byte recordable area is assigned to a data area in which a last data area of the first segment is recorded. That is, by combining the last data area of the first segment and the first data area of the second segment, a 20-byte data area is formed. This 20-byte data area is utilized as the data area of one unit. A 10.5-byte data area of the second segment is followed by a 1-byte first reference area and a remaining 20-byte area is again assigned to the data area. Similar arrangements to those of the first and second segments will hereinafter continue to the last segment (22nd segment) at the unit of 2 segments.

Accordingly, also in the case of the zone B, in one sector, there are recorded the first reference data (gain adjustment reference data) of 33 bytes (2 bytes×11 segments +1 byte×11 segments), the second reference data (phase adjustment reference data) of 20 bytes and various data (desired data) of 640 bytes (9.5 bytes×1 segment+29.5 bytes×10 segments+ 30.5 bytes×11 segments).

As described above, the zones A and B are the same in storage capacity of one sector. According to this embodiment, even in the case of the zone B, respective reference data are inserted at an interval similar to that of the zone A, whereby the arrangements of the respective reference areas and data areas in the recordable area are made common in each zone. In other words, removing the servo byte from each zone, the area arrangement is made exactly the same.

When the data thus recorded is reproduced, the processing is carried out at timings shown in FIGS. 17 and 18. That is, in the case of the zone A, as shown in FIG. 17A, during the one-byte first reference data (gain adjustment reference data) of each segment of each sector is being reproduced, as shown in FIG. 17B, a reproduced amplitude of this reference data is detected by the amplitude detecting circuit 33. Also, in the case of the first segment, during the second reference data (phase adjustment reference data) is being reproduced, as shown in FIG. 17C, a reproduced phase of this reference data is detected by the clock phase detecting circuit 34. Then, the central control apparatus 35 judges the detected states of the respective reference data and controls the gain adjustment amount in the AGC circuit 32 and the phase correcting amount in the clock phase correcting circuit 39. Then, under the condition that the gain adjustment and the phase correction are carried out as described above, as shown in FIG. 17D, data recorded from the second segment to the data area is decoded. Then, each time the segment is changed, the gain adjustment amount and the phase correcting amount are re-adjusted on the basis of the reference data reproduced similarly, thereby carrying out the satisfactory playback continuously. In this case, since the first reference data for gain adjustment, in particular, is detected at every segment, the gain in the AGC circuit 32 can be adjusted at one segment cycle and hence, the gain adjustment can be carried out at a short cycle strictly.

Although the zone B is different from the zone A in arrangement of one segment, as shown in FIG. 18A, during the first reference data (gain adjustment reference data) of one byte is being reproduced, as shown in FIG. 18B, a reproduced amplitude of this reference data is detected by the amplitude detecting circuit 33. Also, in the case of the first segment, during the second reference data (phase adjustment reference data) is being reproduced, as shown in FIG. 18C, after a reproduced phase of this reference data is detected by the clock phase detecting circuit 34, as shown in FIG. 18D, 9.5-byte data successively recorded in the first segment is decoded under the adjusted state based on both reference data. Then, similarly to the zone A, data will hereinafter be decoded each time the data in the data area is reproduced while the gain adjustment is carried out on the basis of the first reference data.

Though not shown, on the basis of the data reproduced from the servo byte of each segment, the sample servo control is carried out at every segment and also data such as track address and sector address recorded on the servo byte are decoded.

Since the recording and reproducing on and from the magneto-optical disc 1 are carried out as described above, the zoning recording in which the area of the magneto-optical disc is divided into the zones is carried out in the magneto-optical disc 1. In this case, the common recording control and reproducing control can be carried out in each zone. That is, excepting for the servo byte, the reference areas and the data areas are set at exactly the same interval. Therefore, when data is recorded on the data area, the recording processing at the unit of 20 bytes is carried out in any of the zones and the data recording unit need not be changed in each zone. Thus, the recording processing such as the addition of a correction code or the like can be carried out in each zone under the common control. Further, upon reproducing, a data playback at the unit of 20 bytes is carried out in each zone and a common playback processing becomes possible in each zone. In particular, since the reproducing interval of the first reference data is the same in each zone, the gain adjustment of the reproducing-system circuit is carried out at the same cycle in each zone on the basis of the first reference data, thereby carrying out the gain adjustment at an optimum interval constantly. Therefore, data can be reproduced under the condition that the gain adjustment is satisfactorily carried out constantly. Hence, data can be reproduced satisfactorily.

Further, since data is not recorded successively after the second reference data, the playback control can be carried out reliably.

While the zoning recording in which the magneto-optical disc is divided into the two zones is effected as described above, the present invention is not limited thereto and can be applied to the zoning recording where the magneto-optical disc is divided into three zones or three zones or more. Furthermore, it is needless to say that the present invention is not limited to the above-mentioned respective embodiments and various modifications could be effected therein.

We claim:

1. A disc recording method in which a disc on which servo control data is recorded in advance, in alignment with a radial direction from the innermost periphery to the outermost periphery, wherein the disc is divided into a plurality of zones in the radial direction, comprising the steps of:

recording digital data having different clock rates on every zone, wherein the number of segments segmented by adjacent servo control data within one track is the same within and among all zones, a number of bytes of data recorded within a segment is different for each zone and a plurality of segments constitute one data sector on said disc; and recording reference data on an entire data recording area of at least one segment segmented by servo control data, the reference data being detectable for control of reproduction of the recorded digital data, wherein said reference data is a reference signal utilized to control a phase of data clock upon reproduction of the recording digital data.

2. The disc recording method according to claim 1, wherein said reference data is pattern data having a repetitive constant frequency.

3. The disc recording method according to claim 1, wherein a rotational angular velocity of the disc is made constant within each zone and recording is effected under the condition that a frequency of a recording data clock is switched at every zone.

4. The disc recording method according to claim 1, wherein a recording data clock frequency is made constant within each zone and recording is effected under the condition that a rotational angular velocity of the disc is switched at every zone.

5. A disc recording method in which a disc on which servo control data is recorded in advance, in alignment with a radial direction from the innermost periphery to the outermost periphery, wherein the disc is divided into a plurality of zones in the radial direction, comprising the steps of:

recording digital data having different clock rates on every zone, wherein the number of segments segmented by adjacent servo control data within one track is the same within and among all zones, a number of bytes of data recorded within a segment is different for each zone and a plurality of segments constitute one data sector on said disc; and recording reference data and zone control data on an entire data recording area of at least one segment segmented by said servo control data, the reference data being detectable for control of reproduction of the recorded digital data, wherein said zone control data represents a whole number of zones and a running zone number.

6. The disc recording method according to claim 5, wherein a quantity of said reference data is equal among all zones.

* * * * *